Patented June 15, 1937

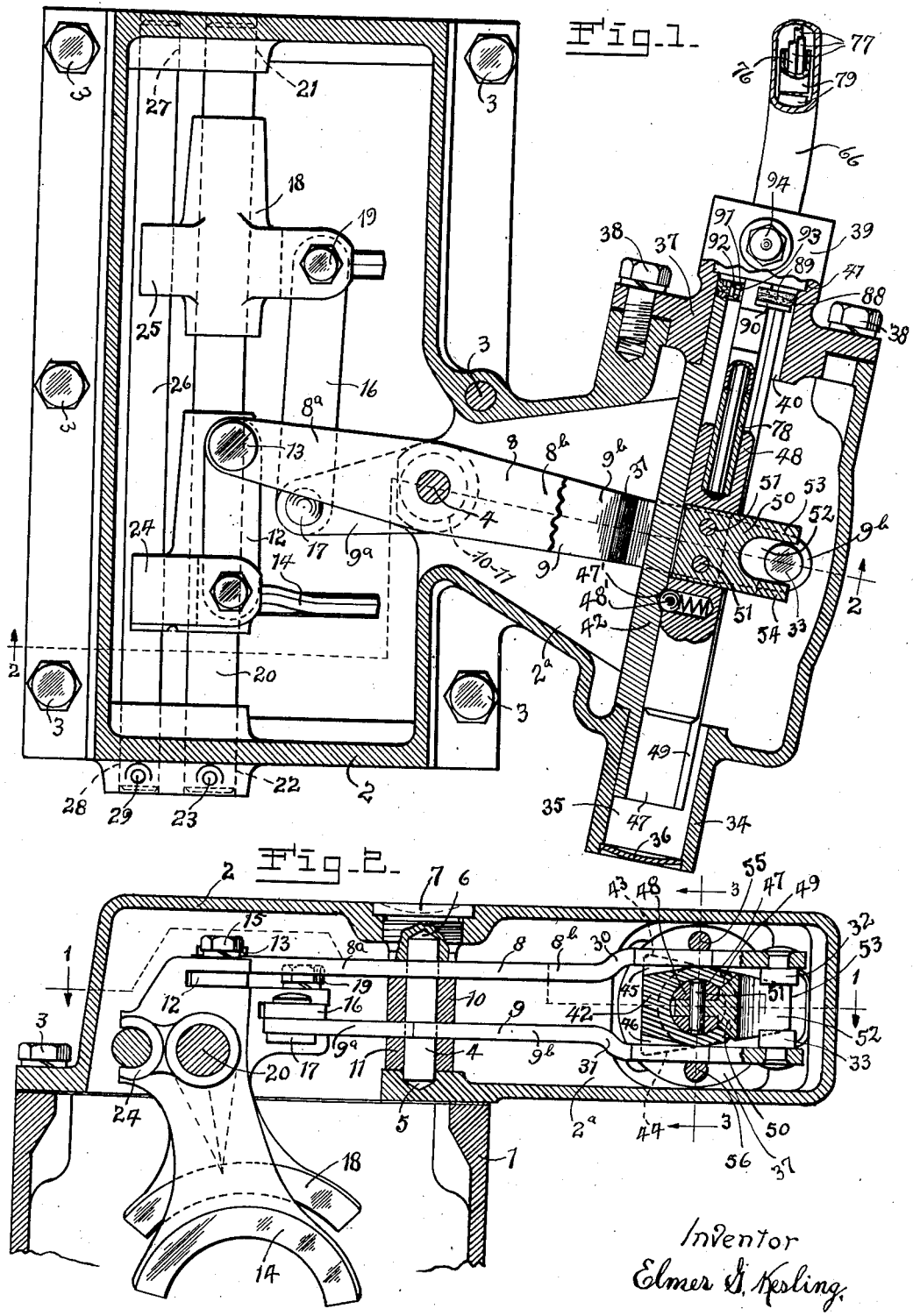

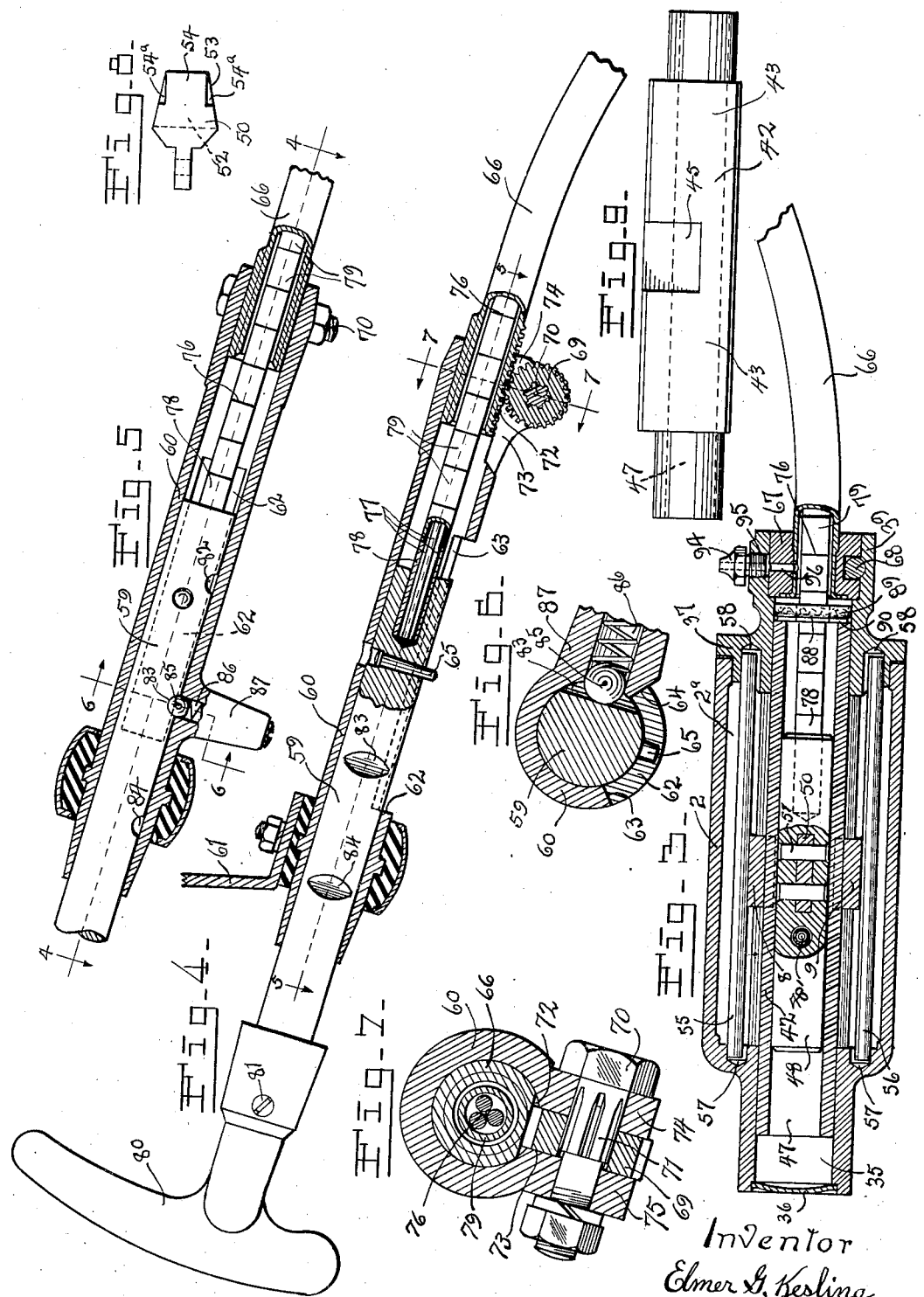

2,083,715

UNITED STATES PATENT OFFICE 2,083,715

GEAR SHIFTING MECHANISM

Elmer G. Kesling, Bloomfield, Mo.

Application November 11, 1935, Serial No. 49,274

17 Claims. (Cl. 74—473)

This invention relates to gear shifting mechanism, and has special utility as a part of the transmission gearing of automobiles and other vehicles.

This invention may be regarded as an improvement on my co-pending application, Serial No. 721,509; and the flexible shaft shown and described is the same as shown, described and claimed in my co-pending application, Serial No. 745,507.

In my application, Serial No. 721,509, the gear shifting mechanism as shown and described has shifter elements which move through an unequal range of movements, and connections which move through equal ranges of movements for moving the respective shifter elements through said unequal ranges of movements; but these shifter elements each move an equal range of movement each way from neutral position. Whereas, in this application, as herein shown and described, the shifter elements not only move through an unequal range of movements; but also each shifter element moves through an unequal range of movement each way from neutral position, while the connections each move through an equal range of movement each way from neutral position for shifting the respective shifter element through said unequal range of movement each way from neutral position.

It is believed that this unequal range of movement of each shifter element each way from neutral position effected by an equal range of movement of the respective operating connection each way from neutral position is new.

Objects of the invention are to provide a gear shifting mechanism having a single actuator for effecting selecting, interlock control and shifting operations; to provide a mechanism capable of free operation and requiring a minimum of effort to effect the operations of selection and interlock control; to provide means directly controlled by the actuator for positively holding the unselected gear devices in their neutral position while the selected gear shifting devices are moved from and to their neutral position; to provide means whereby the whole gear shifting mechanism when brought to neutral or any gear shifted position will be normally and automatically locked against shifting movements if or after the manual selecting force has been released; to provide means whereby the selecting movements will be simply continued to unlock the mechanism, whereupon the selected shifting movements may be effected; to provide mechanism wherein the operating means will always have an equal range of movement from neutral position in effecting a shifted position of the different shifter elements which have an unequal range of movement each way from neutral position; to provide mechanism in which the shifter yokes are both mounted for sliding movements on a single rod, and are both guided by a common rail; and to provide means whereby a different lubricant from that used in the transmission and gear shift cases can be readily applied to the whole length of the flexible control shaft.

Various other objects and advantages of the invention will be made apparent from the following description, reference being made to the annexed drawings, in which—

Fig. 1 is a plan view partly in section on the line 1—1 of Fig. 2 showing the connection of the operating mechanism with the devices operated thereby.

Fig. 2 is a vertical sectional view approximately on the line 2—2 of Fig. 1.

Fig. 3 is a sectional view approximately on the line 3—3 of Fig. 2.

Fig. 4 is a vertical sectional view approximately on the line 4—4 of Fig. 5 showing the upper end of the operating shaft and its connections.

Fig. 5 is a longitudinal sectional view approximately on the line 5—5 of Fig. 4.

Fig. 6 is an enlarged cross sectional view approximately on the line 6—6 of Fig. 5.

Fig. 7 is an enlarged cross sectional view approximately on the line 7—7 of Fig. 4.

Fig. 8 is a rear elevation of the actuator.

Fig. 9 is a top view of the interlock member.

This invention as shown and described is intended to be placed upon a regular transmission case 1 having therein the customary gears, not shown, arranged for selective shifting into a neutral position and into reverse, low, intermediate and high speed positions.

A shift case 2 is secured to the transmission case 1 by bolts 3 and has a portion 2ª which projects to one side and houses a part of the mechanism.

One end of a pin 4 is mounted in a hole 5 in the lower wall of the case 2, and the other end of said pin 4 is mounted in a hole 6 in a plug 7 secured by screw threads in the upper wall of the case 2.

A pair of levers 8 and 9 are mounted for rocking movements on the pin 4. The lever 8 is positioned against the inner end of the plug 7. A tube 10 mounted on the pin 4 holds the levers 8 and 9 in spaced relation, and a tube 11 is mounted on the pin 4 between the lever 9 and the lower wall of the case 2.

An end 8ᵃ of the lever 8 has one end of a link 12 pivotally secured thereto by a headed pin 13 which is riveted to said link; and the other end of the link 12 is pivotally secured in a slot formed in a low and reverse shifting yoke 14 by a bolt 15.

An end 9ᵃ of the lever 9 has one end of a link 16 pivotally secured thereto by a headed pin 17 which is riveted to said link 16; and the other end of said link 16 is pivotally secured in a slot formed in a high and intermediate shifting yoke 18 by a bolt 19.

The yokes 14 and 18 are mounted for sliding movements on a single rod 20 mounted in holes 21 and 22 in the front and rear walls, respectively, of the case 2 and secured therein by a pin 23. The yokes 14 and 18 have formations 24 and 25, respectively, for sliding along a common guide rail 26 mounted in holes 27 and 28 in the front and rear walls, respectively, of the case 2 and secured therein by a pin 29.

The end portions 8ᵇ and 9ᵇ of the levers 8 and 9 are bent away from one another at 30 and 31, respectively, and have studs 32 and 33 riveted or otherwise secured to the adjacent surfaces of their respective ends.

The rear wall of the portion 2ᵃ of the case 2 has a projection 34 which has an axial hole 35 longitudinally therethrough which is closed at its rear end by a disk 36. The front wall of the portion 2ᵃ of the case 2 has an opening therethrough which is covered by a plate 37 secured to said portion 2ᵃ by bolts 38.

The plate 37 has a projection 39 and the plate 37 and projection 39 have a hole therethrough, having an inner smaller portion 40 and an outer larger portion 41 which are in axial alignment with the hole 35.

The shouldered ends of an interlock member 42 are mounted for rocking movements only in the holes 35 and 40, respectively. The body of the interlock member 42 extends between the holes 35 and 40 substantially between the portion 8ᵇ of the lever 8 and the portion 9ᵇ of the lever 9 and has an upper beveled surface 43 and a lower beveled surface 44 which have respective notches 45 and 46 for engagement with the levers 8 and 9, respectively.

At the part engageable with the notches 45 and 46, the respective levers 8 and 9 are of the same width as said notches. The notches 45 and 46 are of such depth that rocking movements of the member 42 will disengage one or the other of the levers 8 or 9; but both of said levers cannot be disengaged at the same time. A hole 47 concentric with the holes 35 and 40 is provided longitudinally through the member 42. A spindle 48 is mounted for longitudinal movements in the hole 47 and for rocking movements with the member 42. A slot 49 is cut along one side wall of the hole 47.

An actuator 50 is secured in a slotted hole through the spindle 48 by pins 51 and projects through the slot 49 and will be made to slide along said slot 49 as the spindle 48 is moved longitudinally in the hole 47. Said slot 49 prevents the spindle 48 from turning in the member 42, and causes the member 42 to turn with the spindle 48 when said spindle 48 is turned.

The projecting actuator 50 terminates into an end having a slot 52 forming anterior and posterior arms 53 and 54, respectively. The arm 54 has upper and lower notches 54ᵃ so the actuator 50 will pass the studs 32 and 33 in assembling the control assembly to the shifting assembly.

The actuator 50 might be secured in some other manner to the spindle 48, in fact they could be made integral; so the spindle 48 and the actuator 50 may be considered as a unit and termed the actuator 48—50.

The levers 8 and 9 through the respective studs 32 and 33 are selectively engaged by the slot 52 as the actuator 48—50 is turned one way or the other. Since the studs 32 and 33 are substantially integral with the respective levers 8 and 9, engagement of the actuator 50 with the studs 32 or 33 may be termed as engagement with the levers 8 or 9.

The upper and lower surfaces of the actuator 50 are beveled on a line with the surfaces 43 and 44 of the member 42. These surfaces of the actuator 50 limit the turning movements of the spindle 48 and actuator 50 by coming in contact with the respective adjacent faces of the levers 8 and 9.

Guide rods 55 and 56 having their rear ends mounted in holes 57 in the rear wall of the portion 2ᵃ of the case 2 and their front ends mounted in holes 58 in the plate 37 are thus placed above and below the levers 8 and 9, respectively, and operate to guide said levers and prevent the spreading apart of said levers 8 and 9. It can readily be seen that the rods 55 and 56 and the surfaces 43 and 44 hold the levers 8 and 9, respectively, in a definite spaced relation at all times so the engagement and disengagement of the actuator 50 will always be positive.

A spring pressed ball 48' mounted in a hole in the spindle 48 engages a notch 47' in the wall of the hole 47 for aiding the placing of the actuator 48—50 in longitudinal neutral position.

It will be noted concerning the levers 8 and 9 that the points in each where force is applied, is fulcrumed and is exerted are all in the same plane of action; therefore the levers will not tend to twist out of position under working stresses.

An operating shaft 59 is mounted for rocking and longitudinal movements in a supporting member 60 which is secured to the instrument panel 61.

A slot 62 having side walls 63 and 64 is provided through the lower wall of the member 60.

A pin 65 mounted in a hole in the shaft 59 projects through the slot 62 and limits the rocking movements of the shaft 59 by engaging the side walls 63 and 64, as the case may be.

A curved tube 66 has one end secured in the hole 41 by a block 67 and a bolt 68, and has the other end adjustably secured in the forward end of the supporting member 60 by a gear 69 and a bolt 70. The bolt 70 has a splined portion 71.

The wall of the tube 66 is thickened at the end and has rack teeth 72 cut therein which mesh with the teeth of the gear 69.

A slot 73 is cut in a thickened wall at the forward end of the member 6 forming ears 74 and 75 between which the gear 69 is placed. A hole is provided through the ears 74 and 75 and the gear 69 to receive the bolt 70; and the hole in the gear 69 is splined to receive the splined portion 71 of the bolt 70.

In adjusting the tube 66 to the supporting member 60, the nut of the bolt 70 is loosened, then the bolt 70 is turned and the gear 69, through the action of the spline 71, will turn with the bolt 70; whereupon the teeth of the gear 69 meshing with the rack teeth 72 will cause the tube 66 to move in or out, as the case may be, of the supporting member 60, and when the correct adjustment has been attained to place the lock notches 82, 83, and 84 in proper relation to the ball 85, the nut of the bolt 70 is tightened and the gear 69 will be clamped between the ears 74 and 75 while the teeth of the gear 69 and rack 72 will positively hold the tube 66 and member 60 in the adjusted position.

A flexible shaft 76 is made up of a plurality of wires 77 twisted upon themselves an integral number of half-turns and secured together at their ends and to end elements 78 with alignment tubes 79 mounted in spaced end relation upon said wires 77 between said end elements 78.

The flexible shaft 76 is guided and supported in the curved tube 66 and one of the end elements 78 is secured to the forward end of the spindle 48 while the other one of the end elements 78 is secured to the forward end of the shaft 59.

The shaft 59 projects beyond the rear end of the supporting member 60 and has an operating handle 80 secured thereto by a screw 81.

A reverse and intermediate speed notch 82, a neutral notch 83 and a low and high speed notch 84 are, respectively, cut in spaced relation into the substance of the shaft 59.

A spring pressed ball 85 is mounted in a hole 86 in a projection 87 in the member 60 for engagement with the notches 82, 83, and 84. The spring pressed ball 85 and the notches 82, 83, and 84 constitute the locking means for locking the shifting mechanism, including the gears not shown, in neutral or any speed position.

It will be noted that the slot 62 is wide enough that the shaft 59 has a greater arc of rotation between limits than the actuator 48—50. This difference in rotations is cared for by the rotative resiliency of the flexible shaft 76.

The notches 82, 83, and 84 are made deep enough and long enough that they will not disengage from the ball 85 until the shaft 59 has been turned beyond the point where the actuator 48—50 has been made to reach the limit of selective rotation. The objects of this extra rotation of the shaft 59 are to insure complete selective rotation of the actuator 48—50, to unlock the notches 82, 83 and 84 from the ball 85, and to utilize the resilient action of the flexible shaft 76 to automatically return the shaft 59 and notches 82, 83, and 84 to normal rotative relation when manual force is released.

This return to normal rotative relation of the shaft 59 will automatically lock the mechanism against shifting movements, when or as soon as all parts are in neutral or a speed position, because the respective notch 82, 83 or 84 will automatically engage the ball 85.

With such an arrangement, it is obvious that no spring pressed detent of any kind is needed at the shifting forks 14 and 18 and shifting movements will be much more easily made.

The spindle 48 and adjacent parts are mounted on an angle with the center line of the transmission case 1 so the tube 66 can be given an easy bend without coming in contact with the bell housing, not shown.

The parts of the mechanism are so constructed and arranged that the control parts, including the levers 8 and 9, will always move the same distance in effecting each of the different shifts, while the shifting forks will move a different distance for each of the different shifts.

This difference of movements is brought about by the angles given the ends 8ª and 9ª of the levers 8 and 9, respectively, relative to the fulcrum pin 4 and the line of movement of the yokes 14 and 18 together with the position of the yoke end of the links 12 and 16 relative to the lever end of said links.

Referring to Fig. 1 of the drawings, and considering the position shown, which is neutral position, of the lever 8ª, link 12 and the line of movements of the yoke 14 on the rod 20, it is obvious that a backward swing of the lever 8ª through a given number of degrees will move the yoke 14 farther than a forward swing of the lever 8ª through the same number of degrees. Also, considering the position shown of the lever 9ª, link 16 and the line of movements of the yoke 18 on the rod 20, it is obvious that a backward swing of the lever 9ª through a given number of degrees will move the yoke 18 farther than a forward swing of the lever 9ª through the same number of degrees.

A valve 88 is shown as being made up of a leather disk 89 curved forward at its outer edge and secured between metal disks 90 and 91 by rivets 92 and mounted in the hole 40 beyond the end of the member 42. A hole 93, slightly larger than shaft 76, is provided through the leather disk 89 and the metal disks 90 and 91 for the easy passage therethrough of the flexible shaft 76.

A connection 94 for admitting lubricant is secured in a hole 95 through the wall of the projection 39, and a hole 96 through the wall of the tubular block 67 and tube 66 connects the hole 95 with the inside of the tube 66.

The spindle 48 is of such length that the end wall 48ª will come in contact with the disk 90 to close the hole 93 when the notch 82 is in engagement with the ball 85. When said parts are in this position, lubricant introduced to the inside of the tube 66 through the connection 94 and holes 95 and 96 will be prevented from flowing into the shifting case 2 by the valve 88. It has been found that fiber grease is preferred in the tube 66 while a lighter grease is better for use in the transmission and shift cases 1 and 2, respectively.

In the operation of the device, the following are some of the conditions to be noted: That the spindle 48, actuator 50 and member 42 cannot be rocked except when the spindle 48 is in such longitudinal position that the levers 8 and 9 are free from the surfaces 43 and 44 at which time the ball 48′ will be in the notch 47′ and the notch 83 will be at or engaged with the ball 85; that the actuator 48–50 cannot be moved longitudinally from neutral or any speed position until the shaft 59 has been turned a sufficient distance for disengagement or to prevent engagement of the respective notch 82, 83 or 84 with the ball 85; that the shaft 59 will be automatically locked against longitudinal movement by the locking means when brought to neutral or a speed position while in a normal rotative relation; that the shaft 59 may be turned an additional distance beyond a fully selected position of the actuator 48–50 against the resilient action of the flexible shaft 76; that the shaft 59 will return to normal rotative relation by the resilient action of the flexible shaft 76 when rotative manual force is relieved; that a new selection, as to the shaft 59, may be made against the resilient action of the flexible shaft 76 at any time; that a new selection, so held, as to the shaft 59, will be completed as soon as the parts are brought to neutral position; that a new selection is prevented from being completed at any place except the neutral position by the surfaces 43 and 44 engaging the levers 8 and 9, respectively that each shifter yoke moves through an unequal distance each way from neutral position in effecting the different speed shifts; that each lever moves through an equal distance each way from neutral position in effecting movement of the respective shifter yoke through said unequal distance each way from neutral position; and that the operating means is moved longitudinally through an equal distance each way from neutral position in effecting a shifting movement of the respective yoke through said unequal distance each way from neutral position.

Therefore, to make a shift into either low or reverse speed, starting from neutral position, manual force is applied to the operating parts 80, 59, 76 and 48–50 to turn the actuator 48–50 to the fully selected position where the stud 32 will be entirely engaged by the slot 52 and the lever 8 will be entirely free from the notch 43 and to continue to turn the operating shaft 59 against the resilient action of the flexible shaft 76 until the notch 83 will disengage the ball 85, and then to apply manual force to move the parts 80, 59, 76 and 48–50 longitudinally to shift the selected gear as desired through the parts 32, 8, 13, 12, 15, and 14, and finally release all manual force to allow the resilient action of the flexible shaft 76 to return the operating shaft 59 to normal rotative relation where either the notch 82 or the notch 84, as the case may be, will engage the ball 85 and lock the parts in the shifted position.

Or, to make a shift into either intermediate or high speed, starting from neutral position, manual force is applied to the operating parts 80, 59, 76 and 48–50 to turn the actuator 48–50 to the fully selected position where the stud 33 will be fully engaged by the slot 52 and the lever 9 will be entirely free from the notch 44 and to continue to turn the operating shaft 59 against the resilient action of the flexible shaft 76 until the notch 83 will disengage the ball 85, and then to apply manual force to move the parts 80, 59, 76 and 48–50 longitudinally to shift the selected gear as desired through the parts 33, 9, 17, 16, 19, and 18 and finally release all manual force to allow the resilient action of the flexible shaft 76 to return the operating shaft 59 to normal rotative relation where either the notch 82 or the notch 84, as the case may be, will engage the ball 85 and lock the parts in the shifted position.

It is obvious that rotative manual force may be relieved from the shaft 59 at any time after either notch 82, 83 or 84 has been disengaged from the ball 85 whereupon the shaft 59 will automatically return to normal rotative relation, and then if shifting movement is made to engage one of the notches 82, 83 or 84 with the ball 85 such engagement will not only stop the shifting movement but also will lock the parts in such shifted position.

In making a speed shift starting from a speed position, the shaft 59 may be turned in either direction to disengage the notch 82 or the notch 84, as the case may be, from the ball 85. If the turning is in the direction for a new selection and the parts are brought to neutral position, the resilient action of the flexible shaft 76 will immediately place the actuator 48–50 in the correct selected position, but if the turning is in the same direction as the old selection, the parts may be brought to neutral position and, if the old selection is desired, the shifting movement may be continued past neutral position or returned from neutral position, provided the shaft 59 is held sufficiently turned to prevent locking in the neutral position; however, if after having moved to neutral position a different selection is desired, the shaft 59 will have to be fully turned in the proper direction before neutral position is passed or returned from in order to be able to effect the desired shift.

It has been found that, in shifting from one speed position to another speed position, it is preferable to fully turn the shaft 59 immediately in the direction of the desired selection.

I do not restrict myself in any unessential respects; but what I claim and desire to secure by Letters Patent is:

1. Gear shifting mechanism of the character described comprising a case, shifter yokes mounted in said case, levers mounted in said case and having permanent link connection with said shifter yokes respectively, an actuator mounted in said case for rocking and longitudinal movements, a device supported by said actuator selectively engageable with said levers respectively, means for rocking said actuator to engage said device with said levers selectively and for moving said actuator longitudinally to operate the selected lever and shift the shifter yokes, and means supporting said actuator and controlled by said device for locking the unselected lever against movement.

2. Gear shifting mechanism of the character described comprising a case, shifter yokes mounted in said case, a link permanently connected to each of said yokes, a lever mounted in said case for each link and permanently connected to said link for shifting said yokes respectively, an actuator mounted in said case and rockable to selectively engage one of said levers and movable longitudinally to operate said selected lever to shift said shifter yokes, means supporting said actuator and controlled by said actuator for locking the unselected lever against movement, and means for rocking and moving said actuator longitudinally.

3. Gear shifting mechanism of the character described comprising a case, shifter yokes mounted in said case, levers mounted in said case and having permanent link connection with said yokes for shifting said yokes respectively, an actuator mounted in said case, operating means extending into said case and connected to said actuator for rotating said actuator for selectively engaging said levers and for moving said actuator longitudinally to actuate said levers to shift the shifter yokes, and means supporting said actuator and controlled by said actuator for locking the unselected lever against movement.

4. Gear shifting mechanism of the character described comprising shifter elements, levers having permanent link connection with said elements respectively, operative means mounted for rotative movements to selectively engage said levers and for longitudinal movements to actuate the selected lever to shift the shifter elements, and means supporting a part of said operating means and controlled by said operating means for locking the unselected lever against movement.

5. Gear shifting mechanism of the character described comprising elements to be shifted to a plurality of positions, connections for shifting said elements respectively, an actuator for moving said connections selectively, a support, a locking means, and operative means connected to said actuator and mounted in said support for rotative movements to selectively position said actuator and to unlock said locking means and longitudinal movements to operate said selectively positioned acutator, said locking means finally automatically co-operating with said support and said operating means to positively lock said elements in any one of the shifted positions.

6. Gear shifting mechanism of the character described comprising elements to be shifted to and from a plurality of positions, an actuator mounted for rotative selective movements and longitudinal shifting movement for shifting said elements selectively, an operating shaft supported for differential rotation with respect to said actuator and connected thereto for imparting rotative and longitudinal movements to said actuator, and means positively preventing a shifting of said elements from any shifted position until said operating shaft has been differentially rotated with respect to said actuator.

7. Gear shifting mechanism of the character described comprising elements to be shifted to and from a plurality of positions, an actuator mounted for rotative selective movements and longitudinal shifting movements for shifting said elements selectively, a flexible shaft connected to said actuator, a manual operating shaft supported for differential rotation with respect to said actuator against the resilient action of said flexible shaft and connected to said flexible shaft for imparting rotative and longitudinal movements to said actuator, and means automatically positioned by the resilient action of said flexible shaft to positively lock said elements in any one of said shifted positions after manual rotative force has been released from said manual operating shaft.

8. Gear shifting mechanism of the character described comprising elements to be shifted from a plurality of positions, an actuator supported for rocking and longitudinal movements for shifting said elements, an operating shaft, means connecting said operating shaft and said actuator for actuating said actuator by said operating shaft and leaving said operating shaft free to rotate beyond said actuator, and means for positively preventing said shifting of said elements from any shifted position until said operating shaft has been rotated beyond said actuator.

9. Gear shifting mechanism of the character described comprising a shaft supported for rocking movements and for longitudinal movements from a plurality of positions, an operating shaft, means connecting said shafts for operating said first shaft by said operating shaft and leaving said operating shaft free to rotate beyond said first shaft, and means positively preventing longitudinal movements of said shafts from any one of said plurality of positions until said operating shaft has been rotated beyond said first shaft.

10. Gear shifting mechanism of the character described comprising a shaft supported for rocking movements and for longitudinal movements from a plurality of positions, a manual operating shaft, a flexible shaft connecting said shafts for operating said first shaft by said operating shaft and giving said operating shaft differential rotation relative to said first shaft against the resilient action of said flexible shaft, and means controlled by said resilient action of said flexible shaft to automatically and positively lock said shafts in any one of said longitudinal positions after the manual rotative force is released from said manual operating shaft.

11. Gear shifting mechanism of the character described comprising a pair of yokes mounted on a single rail for shifting movements, levers having permanent connection with said yokes for shifting said yokes respectively, an operating means rotative to selectively engage one of said levers and movable longitudinally to actute the selected lever to shift the respective yoke, and a device mounted for rotative movements only and controlled by said operating means for locking the unselected levers against movements.

12. Gear shifting mechanism of the character described comprising shifter elements, levers having link connection with said shifter elements for shifting said elements respectively, an actuator selectively engageable directly with said levers for actuating the selected lever, means supporting said actuator and controlled by said actuator for locking the unselected lever against movement, and means for operating said actuator.

13. Gear shifting mechanism of the character described comprising shifter elements, levers having link connection with said elements for shifting said elements respectively, means to selectively engage and operate said levers, and a device mounted for rotative movements only controlled by said means for locking the unselected levers against movements.

14. Gear shifting mechanism of the character described comprising shifter elements, levers having link connection with said elements for shifting said elements respectively, means to selectively engage and operate said levers, and a device mounted for rotative movements only supporting said means and controlled by said means for locking the unselected levers against movements.

15. Gear shifting mechanism of the character described comprising a pair of shifter elements, a pair of levers having link connection with said elements for shifting said elements respectively, means to selectively engage and operate said levers, and a rotative device extending between said levers and controlled by said means for locking the unselected levers against movements.

16. Gear shifting mechanism of the character described comprising a shifting case, a tube attached to said case, a control shaft supported for movements in said case and said tube, a device through which lubricant may be forced into said tube, and valve means cooperating with said case and a part of said shaft only when said part of said shaft is positioned against said valve to prevent said lubricant from entering said case while being forced into said tube.

17. Gear shifting mechanism of the character described comprising shifter elements, levers having permanent connection with said elements for shifting said elements respectively, means to directly engage and operate said levers selectively, and a device supported for rotative movements only and controlled by said means for locking the unselected lever against movement.

ELMER G. KESLING.